United States Patent [19]

Bludis

[11] Patent Number: 4,936,321
[45] Date of Patent: Jun. 26, 1990

[54] VEHICLE ASH RECEIVER WITH ASH DISCHARGING DEVICE

[76] Inventor: Thomas T. Bludis, 1306 Westburn, Catonsville, Md. 21228

[21] Appl. No.: 388,608

[22] Filed: Aug. 2, 1989

[51] Int. Cl.⁵ .................... A24D 1/12; A24F 13/16; A24F 19/00
[52] U.S. Cl. ................... 131/231; 131/174; 131/180; 296/37.11
[58] Field of Search ............ 131/174; 180, 231, 235.1; 224/278; 296/37.8, 37.9, 37.11

[56] References Cited

U.S. PATENT DOCUMENTS

| | | |
|---|---|---|
| 1,525,486 | 2/1925 | Wood . |
| 2,299,668 | 10/1942 | Webster . |
| 2,499,942 | 3/1950 | Boyce .......................... 296/37.11 X |
| 2,556,370 | 6/1951 | Holmes . |
| 2,595,103 | 4/1952 | Schmaling . |
| 2,616,557 | 11/1952 | Gill . |
| 2,680,569 | 6/1954 | Nicholas . |
| 2,733,721 | 2/1956 | Kitchens . |
| 2,764,281 | 9/1956 | Mendenhall ................. 296/37.11 X |
| 2,825,446 | 3/1958 | McDonald . |
| 2,829,776 | 4/1958 | Gill . |
| 2,874,702 | 2/1959 | Walker et al. .................... 131/235.1 |
| 3,247,953 | 4/1966 | Gielow ........................... 296/37.11 X |
| 4,061,149 | 12/1977 | Raczkowski . |
| 4,643,204 | 2/1987 | Ford . |

FOREIGN PATENT DOCUMENTS

| | | | |
|---|---|---|---|
| 1074084 | 10/1954 | France ................................. 131/231 |
| 362883 | 6/1930 | United Kingdom ................ 131/231 |

Primary Examiner—V. Millin
Assistant Examiner—J. Doyle

[57] ABSTRACT

An arrangement that for receiving smoking residue that comprises an ash receiver body (22) that receives a cigarette with its burning end close to tube (28). A discharging device (30) that removes smoke and incinerates ashes from the receiver by wind rushing past it, and a residue storage receptacle (24) that stores, out of sight, all tobacco product residue. The invention provides a simple, convenient, inexpensive, environmentally conscious device that requires less cleaning and is less offensive to non-smoking passengers than a conventional vehicle ash receiver.

7 Claims, 2 Drawing Sheets

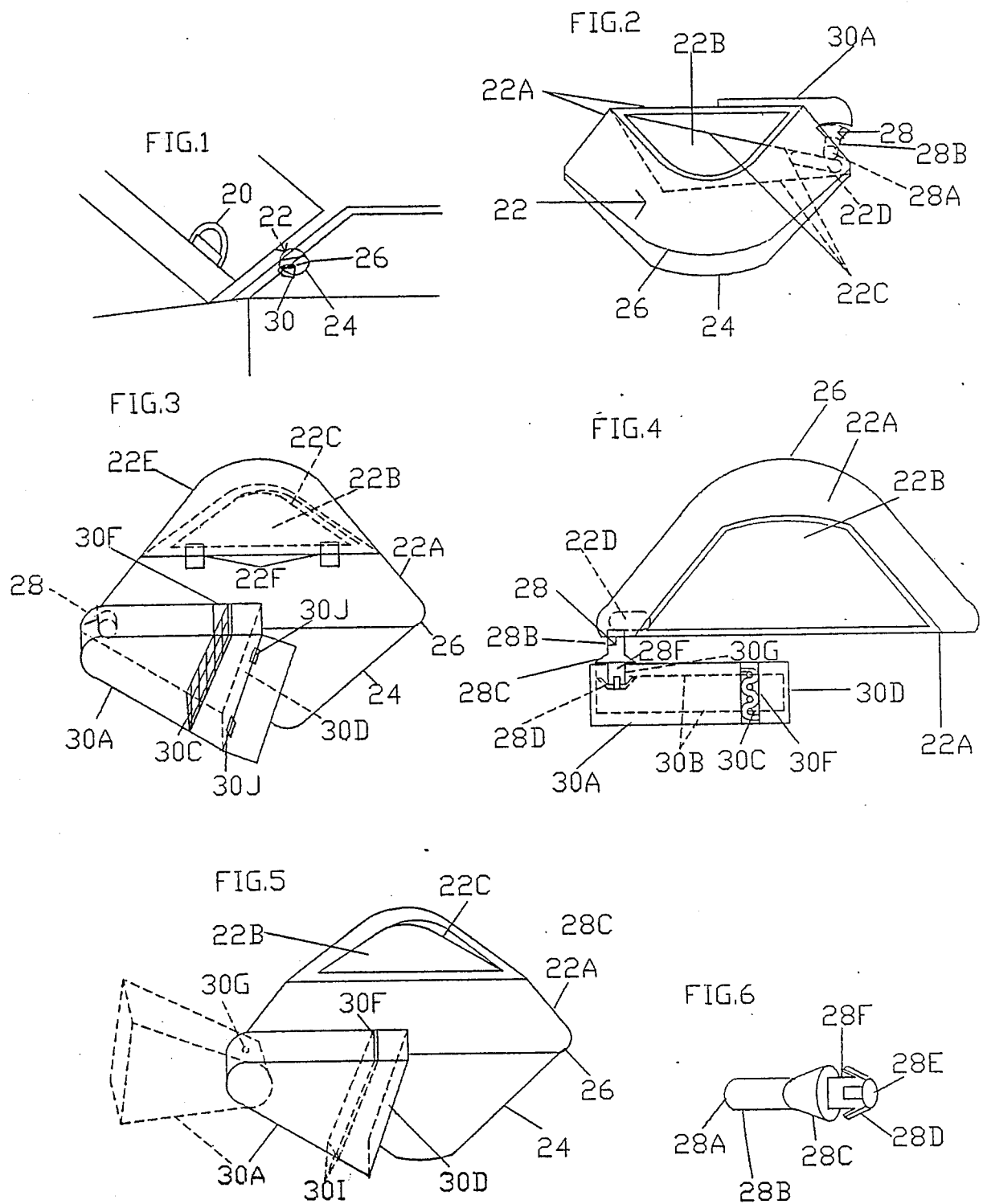

VEHICLE ASH RECEIVER WITH ASH DISCHARGING DEVICE

BACKGROUND

1. Field of Invention

This invention relates to arrangements for receiving and discarding certain residue. It is especially relates to auto ash receiver which discharge smoke and other residue. It facilitates the easy disposal thereof and provides a wide variety of other advantages.

2. Description of Prior Art

Many who own vehicles in which tobacco products are used can appreciate an ash receiver which is practical, convenient, less offensive to nonsmokers and which requires less cleaning.

Heretofore, a wide variety of ash receivers and tobacco residue discharging and disposal devices have been proposed and implemented.

One group of these receivers utilized electric motors. This group is expensive because of the cost of the motor and the necessary electrical or mechanical power it uses. These devices are complex because they have parts which wear. These parts are often noisy because of the electrical and mechanical power used.

Another group of these receivers were comprised in such a way that extensive tubing, pipes and similar material were required to remove the tobacco residue from their receivers. These devices often required alteration to the existing vehicle when installed or required expensive installation at the time of manufacture of the vehicle.

Still another group of these receivers discharged all the tobacco produce residue immediately. This residue (e.g. cigarette filters, cigarette butts, cigar butts, etc.) was either dumped in bulk onto the ground or was incinerated fully. This littered the ground where the residue was dumped or polluted the air with incinerated residue.

Yet another group of these receivers stored all the residue, thus limiting the space in their storage receptacle. By not discharging non-harmful, fully incinerated tobacco product residue, these receivers' storage receptacle were found to be large in comparison with conventional ash trays.

Another group of these receivers were activated by vehicular movement, but were able to discharge residue only when the vehicle was moving in a forward direction.

Another group of these receivers offered no means to extinguish the tobacco product residue, making it possible for them to cause a fire outside the vehicle.

Most vehicle owners who are smokers, therefore, would find it desirable to have an ash receiver which would require less cleaning and be less offensive to nonsmokers, while at the same time being efficient, ecologically sound, inexpensive, convenient and safe.

OBJECTS AND ADVANTAGES

Accordingly, the following are the objects and advantages of this invention: to provide an attractive and convenient arrangement for receiving smoking residue which discharges smoke and tobacco products, is less offensive to nonsmokers and requires less cleaning than a conventional ash tray.

In addition, the following is an object and advantage: to provide an attractive and convenient arrangement for receiving tobacco product residue which operates with the motion of the vehicle, uses no electric motor nor has other wearable parts vital to operation and makes no noise.

In addition, the following is an additional object and advantage: to provide an attractive and convenient arrangement for receiving smoking residue, which in at least one particular embodiment does not require any alteration to the vehicle and is not required to be built into the vehicle.

An additional object and advantage is to provide an attractive and convenient arrangement for receiving smoking residue which discharges smoke and fully incinerated ash from the vehicle while retaining all particles, filters and butts which would pollute the environment if discharged.

An additional object and advantage is to provide an attractive and convenient arrangement for receiving smoking residue which has a small residue storage receptacle to keep all unincinerated particles out of view of the passengers in the vehicle.

In addition, my invention includes the following additional object and advantage: to provide an attractive and convenient arrangement for receiving smoking residue which saves space in its refuse container by discharging all non-harmful, fully incinerated tobacco product residue.

In addition, my invention provides the following additional object and advantage: to provide an attractive and convenient arrangement for receiving smoking residue, which operates when the vehicle is travelling either in a forward or backward motion.

In addition, my invention provides the following additional object and advantage: to provide an attractive and convenient arrangement for receiving smoking residue, which provides a means to extinguish all tobacco product residue which could cause a fire both inside and outside the vehicle.

Readers will find further objects and advantages of the invention from a consideration of the ensuing description and drawings.

DRAWING FIGURES

FIG. 1 shows the ash receiver and the ash discharging device as would be viewed in use from outside the vehicle on the drivers side.

FIG. 2 shows an elevational perspective of such device as viewed in use from inside the vehicle.

FIG. 3 shows an elevational perspective of such device as if viewed in use from outside the vehicle.

FIG. 4 shows a top view of the device.

FIG. 5 shows an elevational perspective of such device as viewed in use from outside the vehicle in use both a forward and reverse motion of the vehicle.

FIG. 6 shows an enlargement of the tube.

DRAWING REFERENCE NUMERALS

Figure 7:
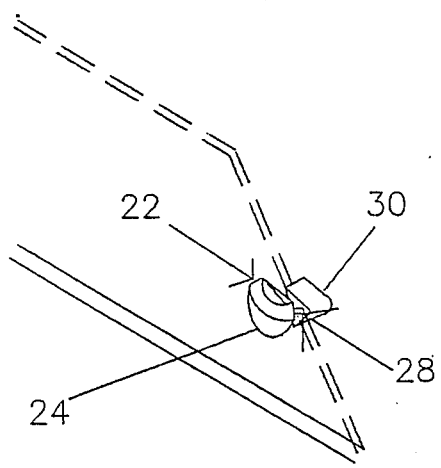
FIG. 7 is a perspective view of the invention.

20 Vehicle steering wheel
22 Ash receiver body
22a Ash receiver sidewalls
22b Ash receiver inclined plane
22c Lines indication junction of 22a and 22b
22d Aperture in 22b
22e Optional cover for ash receiver body
22f Hinges
24 Residue storage receptacle
26 Line indicating junction of 22 and 24

28 Tube
28a aperture of tube
28b Portion of tube that rests on window
28c Conical portion of tube
28d Tube locking tongues
28e aperture in tube
28f Bearing surface
30 Ash discharging device
30a Ash discharging device body
30b Lines indicating side wall of 30a
30c Screen
30d Larger aperture of 30a
30f Rectangular aperture
30g Perimeter of side aperture
30h Optional cover for ash discharging device 30
30i Groove
30j Hinges

VEHICLE ASH RECEIVER WITH ASH DISCHARGING DEVICE—DESCRIPTION

FIGS. 1 and 7 show heat resistant plastic ash receiver with ash discharging device according to the preferred embodiment of the invention. FIGS. 1 and 7 show the device in its in-use position with the ash receiver body (22) and the residue storage receptacle (24) on the inside of the partially opened driver's window. FIG. 1 shows the ash discharging device (30) on the outside of the driver window. The steering wheel (20) illustrates the relative size of the invention.

FIG. 2 best shows the ash receiver body (22) comprises the ash receiver side walls (22a) which are flush with the window on one side and rounded where the sidewalls (22a) do not contact the window.

In FIGS. 2 & 3, the ash receiver inclined plane (22b) joins the inside of the ash receiver side walls (22a) at lines (22c.)

FIG. 2 best shows the ash receiver inclined plane (22b) is angled downward so that any object placed in it would naturally slide toward the aperture in the plane (22d).

In FIGS. 2 & 4, aperture (22d) is slightly wider than the diameter of cigarette and about ½ as long as one cigarette filter.

In FIGS. 1, 2, 3, & 5 the residue storage receptacle (24) is fastened to the ash receiver by suitable means allowing easy separation when desired. This suitable means could be a hinge on the window side of line 26 and a latch on the side farthest from the receptacle along line 26.

In FIGS. 2, 3, & 4, the tube (28) is used to join the vehicle ash receiver body (22) to the ash discharging device (30).

In FIG. 2, aperture (28a) is formed on the inside of the receiver side wall (22a) because the portion of the tube that rests on the window (28b) is permanently attached to the ash receiver side wall (22a).

In FIG. 2 aperture (28a) is of a size suitable to prevent filters or refuse from going into the ash discharging device.

FIGS. 2, 4 & 6 best show portion of the tube that rests on window (28b). FIGS. 4 & 6 best show the conical portion of tube (28c) which tapers toward the inside of the vehicle so that when the window closes, the tube will naturally be thrust in the direction toward the outside the vehicle.

FIGS. 4 & 6 best show the bearing surface (28f) around which the perimeter of a side aperture in (30g in FIG. 4) discharging device body (30a) pivots. FIG. 6 shows the aperture in tube (28e) is formed in the end of bearing surface (28f). FIG. 6 tube locking tongues (28d) are flexible and connected to the bearing surface (28f). FIG. 4 shows tube locking tongues (28d) allowing a permanent locking connection when inserted into side aperture (30g) in ash discharging device (30a).

FIG. 4 shows the lines indicating the side walls (30b) of the ash discharging device body (30a).

FIGS. 3 & 4 show the screen (30c) that contains the unincinerated particles is attached to the inside portion of ash discharging device body (30a) by a suitable means allowing easy removal of the screen (30c). The larger aperture (30d) is best shown in FIGS. 3, 4, & 5. The suitable means to attach screen (30c) are grooves (30i in FIG. 5) made in the inside of ash discharging device body (30a) and a rectangular aperture (30f in FIGS. 3, 4 & 5) cut in the top surface of the ash discharging device (30a). In FIG. 5 these grooves (30i) and aperture (30f) are made to conform to the exact dimensions of the screen so the screen will slide through aperture (30f) into grooves (30i) and remain there by friction.

In FIG. 3 optional cover for ash receiver body (22e) is connected by hinges (22f) or otherwise suitably attached to ash receiver side walls (22a) and optional cover for ash discharging device (30h) is connected by hinges (30j) or otherwise suitably attached to ash discharging device body (30a).

VEHICLE ASH RECEIVER WITH ASH DISCHARGING DEVICE—OPERATION

The vehicle ash receiver with ash discharging device of FIG. 1 will receive a cigarette, keep the cigarette burning, exhaust all ash, cinders and smoke outside the car and store and extinguish the cigarette filter that remains.

In FIG. 2, a lighted cigarette is place on the ash receiver inclined plant (22b). In FIG. 2 the lighted end of the cigarette is placed closest to the aperture (28a). In FIGS. 2, 3 & 4, as the cigarette burns, smoke, ash and cinders are drawn through tube (28), but larger refuse particles or filters are prevented from passing due to the size of the tube (28).

The movement of air causing a vacuum in tube (28), I believe, is caused by air rushing past the ash discharge device body (30a), creating a low pressure area on the inside of the ash discharging device body (30a). In FIGS. 3 & 4, ash and cinder is held within the ash discharging device body (30a) by a screen (30c) until completely extinguished and trapped by the screen (30c) or until completely incinerated and small enough to pass through screen (30c) and larger aperture (30d) as ash dust.

In this particular embodiment FIG. 4 shows perimeter of side aperture (30g) as being able to pivot around tube bearing surface (28f). In FIG. 5, the larger aperture (30d) will always be farther down wind than the end of the ash discharging device body (38a) with the side aperture (30g) in it, regardless of the direction of the vehicle travel because of air pressure acting on the outside of the narrow portions of the ash discharging device body (30a) that are directly adjacent to the larger aperture (30d).

In FIGS. 2 & 4, the lit cigarette burns and shortens due to air movement around aperture (28a). In FIG. 2, the cigarette slides down the ash receiver inclined plane (22b) by gravity always keeping the burning portion of the cigarette adjacent to aperture 28a. In FIG. 2, when the cigarette has shortened to an unusable length, the weight of the cigarette extending over the aperture in ash receiver inclined plane (22d) is greater than the weight of the portion of the cigarette extending onto the surface of the inclined plane (22b) and thus falls into the residue storage receptacle (24). When the still burning cigarette falls into the residue storage receptacle (24), it is extinguished due to being in a partial vacuum created by air movement through tube (28) and due to cigarette consuming all the oxygen in the residue storage receptacle (24) thus starving the burning cigarette of oxygen.

In order to remove the vehicle ash receiver with ash discharge device from the in use in window position shown in FIG. 1, the vehicle window in FIG. 1 must be lowered far enough to allow ash discharge device (30) to be retrieved. In FIG. 3, optional covers (22e) and (30h) hinged and/or otherwise suitable attached may be utilized to cover the openings of the ash receptacle (22) and the aperture (30d) to insure no ashes dirty the inside of the vertical and to ensure all supply of oxygen to still smoldering particles is eliminated thus eliminating any fire hazard. Also in FIG. 3, an additional advantage of the cover for the ash receiver body (22e) would be to reduce the air turbulence near the partially opened window when the cover is in the open position and thus eliminate the risk of wind blowing embers around the interior of the vehicle and possibly starting a fire.

In FIG. 1, in order to clean the ash receiver this entire device is removed from its in-use position.

In FIGS. 2, 3 & 5 the residue storage receptacle (24) and the ash receiver body (22) are separated and all residue is discarded. The ash receiver body (22) and the residue storage recepticle (24) are then rejoined.

In FIGS. 3 & 4, the screen (30c) is removed through aperture through the aperture (30f) and all unincinerated particles are removed from the ash discharging device body (30a). In FIG. 5, the screen (30c) slides back in the ash discharging device body through aperture (30f) and back into grooves (30i). The entire device is then placed back in its in-use position.

Thus, the reader will see that the vehicle ash receiver with ash discharge device invention provides an inexpensive, simple, convenient, environmentally conscious device that will require less cleaning and be less offensive to non-smoking passengers than would a conventional ash tray.

While the above description contains many specificities, these should not be construed as limitation on the scope of the invention, but rather as an exemplification of one preferred embodiment thereof. For example, many different ways to secure the ash receiver body (22) of FIGS. 2, 3, & 4 and the residue storage receptacle (24) together could be utilized. Snap tight plastic fittings, latches, tongue and groove fittings, and hinges are but a few ways to secure the two parts together. Also, the residue storage receptacle (24) is not vital to the operation of the device and could be eliminated, provided the form of the ash receiver body (22) be altered accordingly. The device could be installed permanently to eliminate the need for removing the device from its temporary position when the vehicle windows are opened. The device could be outfitted with fabric or a pad suitable for protecting the window where the device would come into contact with it. The device could assume any form or reasonable dimensions. An example would be to change the shape so as to fit the passenger side of the vehicle or alter it so it would be more appealing to the eye. Skilled artisans will readily be able to make the device of alternative materials such as, but not limited to, glass and metal. In FIGS. 3, 4 & 5, those skilled in art could also change the shape of the ash discharging device body (30a) to more effectively create a vacuum in tube (28) or secure and position the screen so it would be more effective or easier to clean. Accordingly, the reader is requested to determine the scope of the invention by the appended claims and their legal equivalents and not by the examples that have been given.

I claim:

1. An arrangement for receiving smoking residues comprising:
    an ash receiver body having an aperture small enough to prevent the passing of a cigarette filter through it,
    an ash discharging device having a side aperture of approximately the same size as the said aperture in said ash receiver body,
    an aperture larger than said side aperture in said ash discharging device at an end remote from said side aperture whereby wind passing the said discharging device in a direction to pass by said large aperture last creates a vacuum inside said ash discharging device,
    said discharging device having a means to retain all unincinerated particles passing through said side aperture,
    a tube having an attachment means for attachment to said ash receiver body at said aperture in said ash receiver body,
    said tube having attachment means for attachment to said ash discharging device at said side aperture.

2. The arrangement for receiving smoking residue of claim 1 wherein said tube has rotatable attachment means for attachment to said ash discharging device at said side aperture.

3. The arrangement for receiving smoking residue of claim 1 wherein said ash receiver body has an additional aperture slightly wider than the diameter of a cigarette and about one half as long as a cigarette filter in the vicinity of said aperture in said ash receiver body and,
    said ash receiver having means for storage of smoking residue passing through said additional aperture.

4. The arrangement for receiving smoking residue of claim 2 wherein said ash receiver body has an additional aperture slightly wider than the diameter of a cigarette and about one-half as long as a cigarette filter in the vicinity of said aperture in said ash receiving body and,
    said ash receiver body having a means for storage of residue passing through the additional aperture.

5. An arrangement for receiving smoking residue comprising:
    an ash receiver body having an aperture,
    an ash discharging device having a side aperture of approximately the same size of said aperture in ash receiver body,
    an aperture larger than said side aperture in said ash discharging device at an end remote from said side aperture whereby wind passing the said discharging device in a direction to pass by said larger aperture last creates a vacuum inside the said ash discharging device,
    said ash discharging device having a means to retain all unincinerated particles passing through said side aperture, a tube having attachment means for attachment to said ash receiver body at said aperture in said ash receiver body, said tube having rotatable attachment means for attachment to said ash discharging device at said side aperture.

6. An arrangement for receiving smoking residues comprising:

an ash receiver body having an aperture, an ash discharging device having a side aperture of approximately the same size of the said aperture in ash receiver body, an aperture larger than said side aperture in said ash discharging device at an end remote from said side whereby wind passing the said discharging device in a direction to pass by said larger aperture last creates a vacuum inside said ash discharging device, a means to retain all unincinerated particles passing through said side aperture, a tube having attachment means for attachment to said ash receiver body at said aperture in said ash receiver body, said tube having attachment means for attachment to said ash discharging device at said side aperture, said ash receiver body having an additional aperture wider than the diameter of a cigarette and about one-half as long as a cigarette filter in the vicinity of said aperture in said ash receiver body, and said ash receiver body having means for storage of residue passing through said additional aperture.

7. The arrangement for receiving smoking residue of claim 6 wherein said tube has rotatable attachment means for attachment to said ash discharging device at said side aperture.

* * * * *